United States Patent [19]

Paradis

[11] 4,410,096
[45] Oct. 18, 1983

[54] INTEGRAL CAP AND CONTAINER
[75] Inventor: Joseph R. Paradis, Holden, Mass.
[73] Assignee: Nypro Inc., Clinton, Mass.
[21] Appl. No.: 306,550
[22] Filed: Sep. 28, 1981

Related U.S. Application Data

[63] Continuation-in-part of Ser. No. 143,126, Apr. 23, 1980, abandoned.

[51] Int. Cl.³ .............................................. B65D 17/40
[52] U.S. Cl. ...................................................... 215/32
[58] Field of Search .................. 215/32, 2; 222/541; 220/265, 266, 307

[56] References Cited

U.S. PATENT DOCUMENTS

| | | | |
|---|---|---|---|
| 3,187,966 | 6/1965 | Klygis | 222/541 |
| 4,231,486 | 11/1980 | Bock | 220/266 |
| 4,260,065 | 4/1981 | Van Cromvoirt | 215/32 X |

FOREIGN PATENT DOCUMENTS 935117 8/1963 United Kingdom .................. 215/32

Primary Examiner—Donald F. Norton
Attorney, Agent, or Firm—George E. Kersey

[57] ABSTRACT

Container with a wall that is integrated with a cap having a plug that extends sufficiently through a weakened region of the container wall to prevent inadvertent rupture of the cap during shipment and handling of the container. Because of the extension of the plug, inadvertent movement of the cap produces only a rotation of the plug into contact with a side wall of the container that limits any further rotation and prevents inadvertent breakage of the plug and consequent loss of the container contents. The container and integral cap are desirably fabricated by injection molding with plastic materials.

10 Claims, 7 Drawing Figures

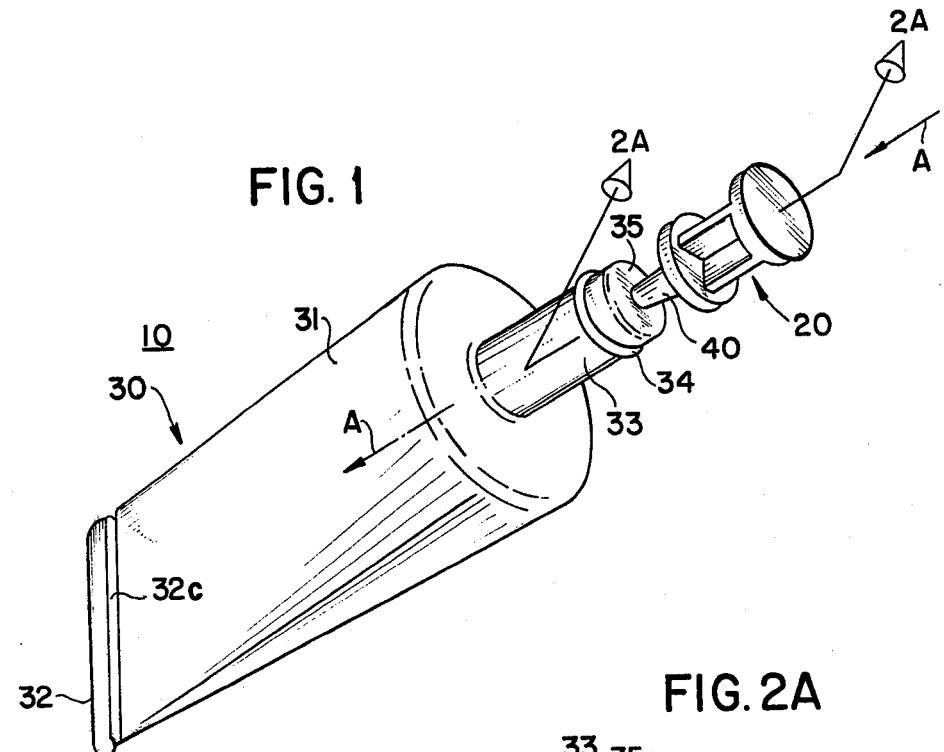
FIG. 1
FIG. 2A
FIG. 2B
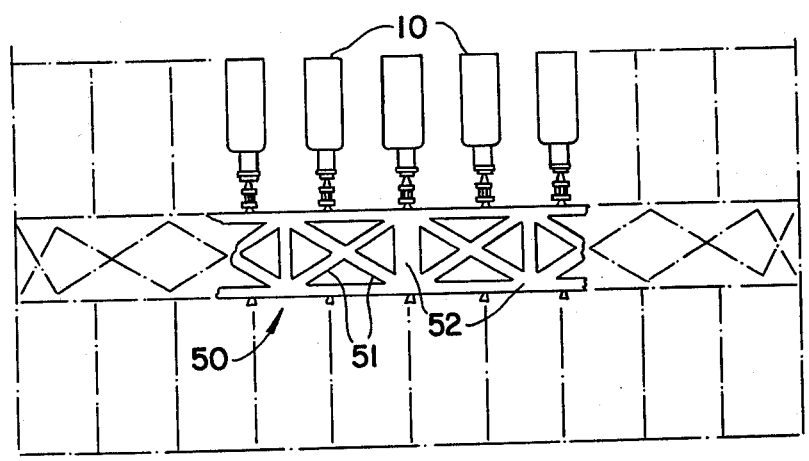
FIG. 3

INTEGRAL CAP AND CONTAINER

This is a continuation-in-part of Ser. No. 06/143,126 filed Apr. 23, 1980, now abandoned.

BACKGROUND OF THE INVENTION

This invention relates to containers with caps that are integrated with the walls thereof and to methods of fabricating and using such containers without causing inadvertent breakage of the caps.

Containers with integral caps are widely used. They provide a storage compartment in which the contents remain completely sealed until they are ready for use. At the time of use the cap is severed from the associated container, typically by cutting, torsional shearing or by bendably breaking the cap from the container. In some cases, the cap is depressable into the container. Examples are provided by U.S. Pat. Nos. 2,849,739; 3,083,848; 3,187,966; 4,066,190; 4,081,108; 4,122,980; 4,134,511; 4,137,977; 4,176,755; 4,231,486 and 4,260,065. Other examples are provided by British Pat. No. 935,117, published Aug. 28, 1963; Austrian Pat. No. 202,510, issued Mar. 10, 1959, and Swiss Pat. No. 289,564, published July 1, 1953.

The severing process required with ordinary integral cap containers often poses difficulties and inconvenience. Cutting implements are now always available, and their cutting action can damage the cap and interfere with the subsequent closure of the container. In the case of caps that require a twisting or breaking action, substantial force can be required. The twisting and breaking action can also damage the interface between the cap and its associated container. The result is interference with subsequent closure. In some cases the amount of twisting and breaking force can be so great, severence is not easily achieved and additional measures are required.

In general, where the cap is integrated with the container in a way that makes severence of the cap comparitively simple, there is a significant danger of inadvertent breakage during handling and shipment. The need to prevent inadvertent breakage has previously interfered with the desire to provide integrated caps that are easily closable.

Accordingly, it is an object of the invention to facilitate the use and construction of integral cap devices. Another object is to simplify such devices.

A further object of the invention is to curtail the amount of cutting, breaking and twisting needed in severing an integral cap from its associated container.

Another object of the invention is to provide an integral cap device that is not easily damaged in handling and shipment. A related object is to limit the extent to which an integrated cap will be separated from its associated container during shipment and handling. Another related object is to avoid in inadvertent rupture of integrated cap and consequent loss of container contents during handling and shipment.

A still further object of the invention is to expedite the use and reuse of integral cap containers. A related object is to expedite the reuse of integral cap containers that are resistant to inadvertent breakage and damage during handling and shipment. Another related object is to achieve a satisfactory, simplified and reusable seal between an initially integral cap and its associated container.

SUMMARY OF THE INVENTION

In accomplishing the foregoing and related objects, the invention provides a container with a cap that is integrated with the wall of the container by a plug that extends from the cap through a weakened wall of the container by an amount that is sufficient to limit the danger of inadvertent separation of the cap from the container during use and handling.

In accordance with one aspect of the invention, the extended plug, within the container, is proportioned with respect to the side walls of the container so that inadvertent forces applied to the cap will cause a limited rotation of the extended plug into contact with a stop associated with the side wall of the container. Because the amount of rotation of the cap is severely limited, the danger of inadvertent breakage and separation is significantly curtailed.

In accordance with another aspect of the invention, the wall through which the plug extends is weakened in such a way that forms a aperture with a rounded shoulder when the cap is depressed towards the container. As a result, the need for severing, torsional twisting, or bending action is eliminated and the cap is easily severed from the container by the simple action of depressing the plug into the container. In addition, the weakened region leaves a ring on the plug which engages a mating groove of the container to promote the reusable seal that is provided by the invention.

In accordance with yet another aspect of the invention, the container is easily produced by the molding of plastic material with the container body extending to the plug and the cap attached to a runner system. This construction is easily realized by the injection molding of plastic materials such as nylon, polypropylene, and polyethylene.

DESCRIPTION OF THE DRAWINGS

Other aspects of the invention will become apparent after considering several illustrative embodiments, taken in conjunction with the drawings in which:

FIG. 1 is a perspective view of a container integrated to a cap by a plug in accordance with the invention;

FIG. 2A is a cross-sectional view of the plug portion of the integral cap and plug container of FIG. 1 showing the extension of the plug into the container to limit the possibility of inadvertent separation of the plug from the container;

FIG. 2B is a cross-sectional view of the plug portion of the container after the plug has been pushed into the container and the cap removably secured to the aperture formed in the container;

FIG. 3 is a plan view of a set of integral cap containers molded using a runner system in accordance with the invention;

DETAILED DESCRIPTION

Figure 4A:
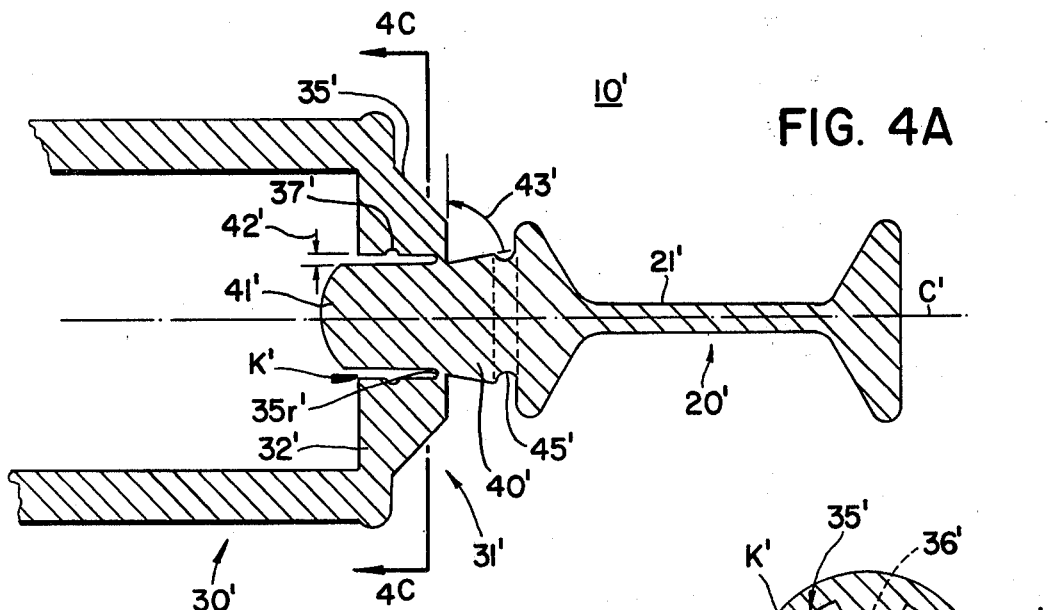
FIG. 4A is a sectional view of an alternative cap and plug in accordance with the invention.

With reference to the drawings, an integral cap container 10 in accordance with the invention is shown in FIG. 1 with a cap 20 secured to a body 30 by a plug 40. In the particular embodiment of FIG. 1, the body 30 is a cylindrical tube 31 with a sealed base 32 and a projecting neck 33. The base 32 can be sealed in any convenient way, for example by a crimp 32c.

The neck 33 of the integral cap container 10 is for convenience only. It will be understood that the cap 20 may be integrated at the end, the latter advantageously includes a gripper ring 34 that encircles the neck below the end wall 35.

For the embodiment of FIG. 1, the cap 20 is integrated with the body 30 by a plug 40 at the wall 35.

As demonstrated in FIGS. 2A and 2B, the structure 10 is such that interior access is easily achieved by merely pushing the cap towards the body portion 30 in the direction indicated by the arrow A. Application of the desired thrust is facilitated by holding the gripper ring 34 between the thumb and index finger. The cap 20 can be similarly gripped.

Structural details of the integration of the cap 20 with the end wall 35 by the plug 40 are pictured in FIG. 2A. The end wall 35 has an interior surface with a recess 35r which encircles the tip 41 of the plug 40. A second recess 35s can also be included to promote the desired severance of the wall 35 in accordance with the invention. Similarly, the wall 35 includes an inner taper on the base 32 at an angle of about 60° with respect to the outer surface of the end wall 35. In particular, the end wall 35 and the depth of the recess 35r is desirably less than one-third the thickness of the container walls elsewhere. The depth of the second recess 35s is preferably about one-half of the wall thickness next to the plug.

In order to promote the action of the plug 40, it forms sharp corners where it enters and leaves the end wall 35. In particular, the entry angle 42 is slightly greater than 90° and the exit angle 43 is slightly less than 90°.

The tip 41 is also rounded to facilitate the re-entry of the plug 40 into the neck 33 on re-sealing.

More importantly, the tip 41 is of greater length, commencing at the interior of the end wall 35 than the width of the channel K in the neck 33. In the embodiment of FIG. 2A the tip 41 is sufficiently long that any thrust applied to the cap 20 will produce a maximum deviation of the tip 41 from the axis A of 30°. As a result inadvertent movement of the cap during shipment and handling is unlikely to cause breakage of the plug and unintended loss of the container contents. The security of the cap 20 is promoted by the extent to which the angle of possible displacement of the tip 41 from the center line C is less than 30° before the displaced tip comes into engagement with the inner side wall 33w of the neck 33 as illustrated by the phantom tip 41'.

The outer wall 44 of the plug 40 tapers outwardly from its center line C. When the cap 20 is pushed towards the container, there tends to be a rounded shearing of the wall 35, creating an aperture with a rounded rim 36 that seats into the circumferential notch 45 of the plug 40 as shown in FIG. 2B.

Also shown in FIG. 2B is a rim 46 that is created between the tip 41 and the body of the plug 40. This rim 46 serves as a baffle to deflect any liquid contents of the container away from the seat between the circumferential groove 45 of the plug and the circumferential rim 36 created in the end wall 35 of the container 30. In addition, the rim 46 limits the extent of axial movement of the plug 20 with respect to the center line C after the plug has been seated in the circumferential rim 36.

It will be apparent that the invention permits the reusable use of the container 30 and avoids the need for a cutting instrumentality, or any torsional shearing or breakaway action which could damage the interface between the cap 20 and the container 30, and consequently interfere with any subsequent sealing. More significantly, the extension of the tip 41 provided in accordance with the invention limits the possibility of inadvertent breakage of the plug and consequent loss of the container contents during shipment and handling of the container. The invention further achieves a relatively tight seal between the rim 36 and the plug 40.

The invention is readily implemented by molding in accordance with the structure shown in FIG. 3. Individual integral cap containers 10 are attached to a runner system 50 and produced by injection molding of suitable plastic materials including nylon, polypropylene and polyethylene.

The runner system 50 is the result of channels provided in the mold for the containers 10 to permit the plastic material to flow to the cavities of the individual containers. Ordinarily the runner system is provided by a cylindrical mold channel which acts as the main passage for the flow of plastic material through branched channels for the individual container cavities.

In the particular configuration of FIG. 3 however, the runner system 50 is in the form of a ladder with cross connectors 51 and rungs 52. This facilitates the flow of plastic during molding. At the same time there is additional strength in the runner system to enable further processing after molding. In some cases the additional strength provided by the runner guards against inadvertent damage to the structure as well as the inadvertent depression of the cap into the container. In other case, the additional strength provided in the runner system permits the cap to be automatically depressed into the container where that is desired for the final product. The components of the ladder structure may be of any convenient cross section, but are desirably of circular cross section for the rails at which the containers are connected as well as for the cross connectors 51 and the rungs 52.

The mold also includes an insert for each container in accordance with its interior configuration.

In an illustrative embodiment of the invention, the plug 40 had a taper away from the tip 41 of approximately 8° and an internal diameter at the sealing groove of about 0.041". The diameter of the plug at its intersection with the exterior of the recess 35r was approximately 0.039". The tip 41 had a radius of approximately 0.012" at a center approximately 0.012" from the outside surface of the end wall 35 on the center line C. The weakened wall thickness was approximately 0.010", forming an angle of approximately 60° at the end of the recess 35r. The width of the channel K in the neck 33 was approximately 0.060" and the length of the tip 41 from the recess 35r was approximately 0.100".

An alternative embodiment 10' of the invention is shown in the partial sectional view of FIG. 4A. The cap 20' is secured integrally to a body 30' by a plug 40'. The body has a collar 31' that extends to side walls. The container body can have a base (not shown) of conventional constructions.

The cap 20' is integrated with the body 30' at a wall 35' which originates at the collar 31' and extends to and into the plug 40'. In addition, the collar 31' has its wall 35' thickened to provide a narrow channel K' with respect to and surrounding the tip 41'. In the particular embodiment of FIG. 4A the tip 41' has a length greater than the width of the ring formed by the channel K', as well as a length greater than the maximum diameter of the ring at the opening into the channel K'. The proportions of the plug 40' are further restricted to permit a maximum departure from the center line C' of about 30° in the case of any inadvertent force applied the cap 20' during handling and shipment. The wall 35' further includes indentations 37' in the surface facing the tip 41'. These are provided, as demonstrated below, to assist in securing the plug 40' in the container body when the cap 20' is purposely depressed into the collar 31'.

As further indicated in FIG. 4A, the connection between the collar 31' and the plug 40' by the wall 35' is in the form of a wedge with side walls forming respective angles 42' and 43' with respect to the intersected walls of the plug 40'. In the particular embodiment of FIG. 4A the angle 42' is less than the angle 43'. Both of the angles 42' and 43' are less than 90° with the angle 43' being slightly greater than 45° and the angle 42' being less than 30°. In an illustrative embodiment, the angle 42' ranged between 70° and 80° and the angle 42' ranged between 0° and 45°.

Figure 4C:
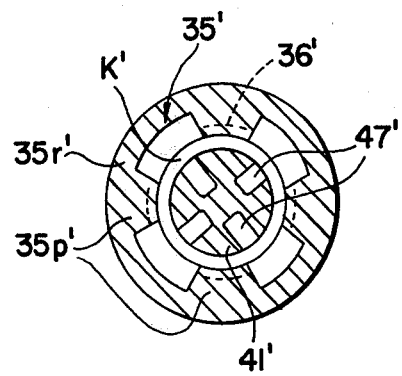
FIG. 4C is a cross-sectional view of FIG. 4A taken along the lines 4C—4C.
Figure 4B:
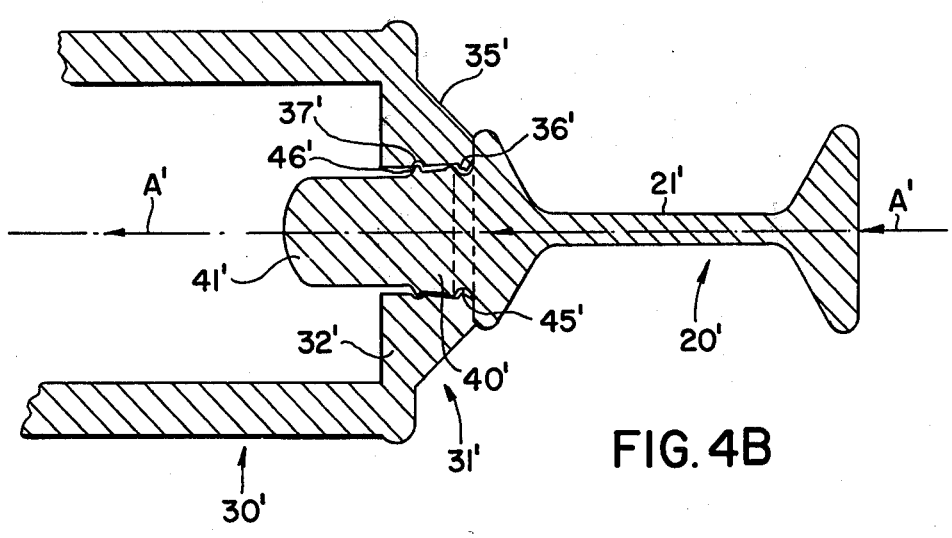
FIG. 4B is a further sectional view of the integral cap and plug of FIG. 4A after the plug has been pushed into its associated container.

The structure 10' is configured such that the contents of the body 30' are inaccessible until the plug 40' has been pushed into the body 30'. As indicated in FIG. 4B, this is accomplished by applying thrust to the cap 20' in the direction indicated by the arrows A'. The direction of thrust is along the longitudinal axis of the cap 20' which serves also as the center line of the opening created in the collar 31' when the plug 40' is forced into the body. Where desired, a recess (not shown) can be included at the annular recess 35r' on the interior surface of the collar 31' at the plug 40'. The provision of the desired thrust is promoted by the inclusion of a flat 21' on the cap 20'. When the plug 40' has been depressed into the collar 21' it leaves a slight annular protuberance 46' on the tip 41' of the plug 40' and a rim 36' is created which seats and seals a depressed rim 45' provided between the plug 40' and an adjoining flange of the cap 20'. Because of the orientation of the wedge intersection of the collar 31' with the plug 40', the rim 36' tends to have a rounded shoulder which meshes with a corresponding rounded portion of the annular groove 45'. Consequently, in those cases where a complete seal of the cap 20' with respect to the body 30' is not initially required, the manufacturing operation that gives rise to the structure 10' can include the step of forcing the cap 20' into the body 30' to achieve, as a final product, the structure shown in FIG. 4B. The annular protuberance 46' can then serve a wiping function when the cap 20' is withdrawin from the body 30' during subsequent usage. A similar wiping function subsequently takes place when the cap 20' is reinserted into the body 30' after usage of the structure 10'.

It is to be further noted that in the embodiment of FIG. 4B the annular protuberence 46' seats into the recesses 37' in the interior wall of the collar 31'. This promotes the sealing engagement of the plug 40' with the container 30'. In addition, as indicated in the cross-sectional view of FIG. 4C, the collar 31' has its wall 35' in two portions, a ring 35r' and a projection 35p' which forms the desired channel K' between the tip 41' and the wall 35'. The amount of material used for the tip 41' can be reduced by the introduction of grooves 47' which are disposed on the tip 41' so as not to interfere with the limited angular displacement of the tip until there is engagement with the wall 35' (at the projections 35p'), in accordance with the invention. In the particular embodiment of FIG. 4C there are four such grooves 47' which are positioned along opposite ends of intersecting diameters which flank the projections 35p'.

While various aspects of the invention have been set forth by the drawings and specification, it is to be understood that the foregoing detailed description is for illustration only and that various changes in parts, as well as the substitution of equivalent constituents for those shown and described may be made without departing from the spirit and scope of the invention as set forth in the appended claims.

What is claimed is:

1. A container with an integral cap, comprising a plug extending from said cap through a wall of said container, said wall having a weakened region which becomes deformed and severed when said cap is depressed towards said container, and said plug having an extension into the interior of said container which is proportioned to limit the movement of said cap during shipment and handling of said container to resist severence of said cap from said container during the occurrence of inadverent forces during handling and shipment by the contact of the extension of said plug with an interior wall of said container before a force sufficient to rupture said wall is encountered.

2. A container in accordance with claim 1 wherein the extension of said plug is limited to a angular displacement of less than about 30 degrees during the occurrence of inadvertent forces applied to said cap.

3. A container in accordance with claim 2 wherein said displacement is ended by the occurrence of contact of the plug extension with said wall.

4. A container in accordance with claim 1 wherein said container includes a neck having an interior opening with a diameter which does not exceed the length of said extension.

5. A container in accordance with claim 1 wherein said wall and said extension form a channel which is narrower than the length of said plug.

6. A container in accordance with claim 1 wherein said plug has a conical shape with external walls which diverge away from the connection of said plug to said container wall.

7. A container in accordance with claim 1 wherein said plug contains a sealing groove between said cap and said wall.

8. A container in accordance with claim 1 wherein said weakened region includes a plurality of recesses having different widths.

9. A container in accordance with claim 1 wherein said wall is on the end portion of said container.

10. A container in accordance with claim 1 wherein said cap is formed by injection molding using a runner system in the form of a ladder to facilitate the flow of plastic during molding and provide added strength to facilitate secondary operations.

* * * * *